US007891551B2

(12) United States Patent
Cha et al.

(10) Patent No.: US 7,891,551 B2
(45) Date of Patent: Feb. 22, 2011

(54) TWO-STAGE LOCK STRUCTURE OF AUTOMATIC TELLER MACHINE

(75) Inventors: Jin Hwan Cha, Gyunggi-Do (KR); Sung Chang Hur, Gyunggi-Do (KR)

(73) Assignee: Nautilus Hyosung Inc., Seoul (KR)

(*) Notice: Subject to any disclaimer, the term of this patent is extended or adjusted under 35 U.S.C. 154(b) by 882 days.

(21) Appl. No.: 11/747,522

(22) Filed: May 11, 2007

(65) Prior Publication Data

US 2007/0267808 A1 Nov. 22, 2007

(30) Foreign Application Priority Data

May 17, 2006 (KR) ..................... 10-2006-0044184

(51) Int. Cl.
*G06Q 40/00* (2006.01)
*G07D 11/00* (2006.01)
*G07F 19/00* (2006.01)

(52) U.S. Cl. ................................ 235/379; 902/8; 109/2

(58) Field of Classification Search ................. 235/379; 902/8-21; 109/2, 24.1, 45, 46; 194/206, 194/350; 209/534
See application file for complete search history.

(56) References Cited

U.S. PATENT DOCUMENTS

| | | | | |
|---|---|---|---|---|
| 4,809,967 | A * | 3/1989 | Kondo | 271/181 |
| 5,167,411 | A * | 12/1992 | Isobe | 271/273 |
| 5,505,439 | A * | 4/1996 | Watabe et al. | 271/177 |
| 5,813,914 | A * | 9/1998 | McKay et al. | 463/46 |
| 6,019,207 | A * | 2/2000 | Cole | 194/206 |
| 6,158,565 | A * | 12/2000 | Mikami et al. | 194/206 |
| 6,457,586 | B2 * | 10/2002 | Yasuda et al. | 209/534 |
| 6,588,569 | B1 * | 7/2003 | Jenrick et al. | 194/206 |
| 6,959,859 | B2 * | 11/2005 | Saltsov et al. | 235/379 |
| 2002/0140164 | A1 | 10/2002 | Frey | |
| 2006/0081441 | A1 * | 4/2006 | Vysma et al. | 194/206 |

FOREIGN PATENT DOCUMENTS

| | | | |
|---|---|---|---|
| CN | 2702789 | Y | 6/2005 |
| CN | 1681420 | A | 10/2005 |
| KR | 2005070717 | A | 7/2005 |
| KR | 2005076126 | A | 7/2005 |

* cited by examiner

*Primary Examiner*—Michael G Lee
*Assistant Examiner*—Suezu Ellis
(74) *Attorney, Agent, or Firm*—Fish & Richardson P.C.

(57) ABSTRACT

A two-stage lock structure of an ATM is described that can prevent an operator from being injured during the removal of a currency note jam.

5 Claims, 11 Drawing Sheets

[Fig. 1]
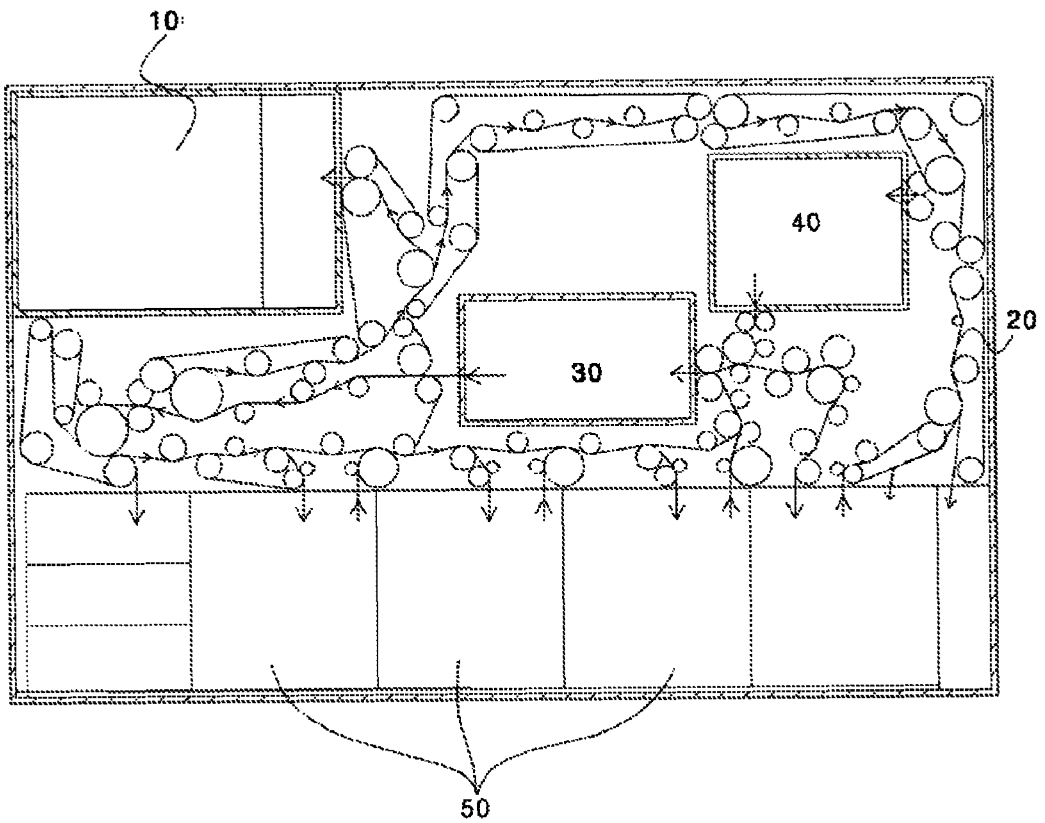
[Fig. 2]
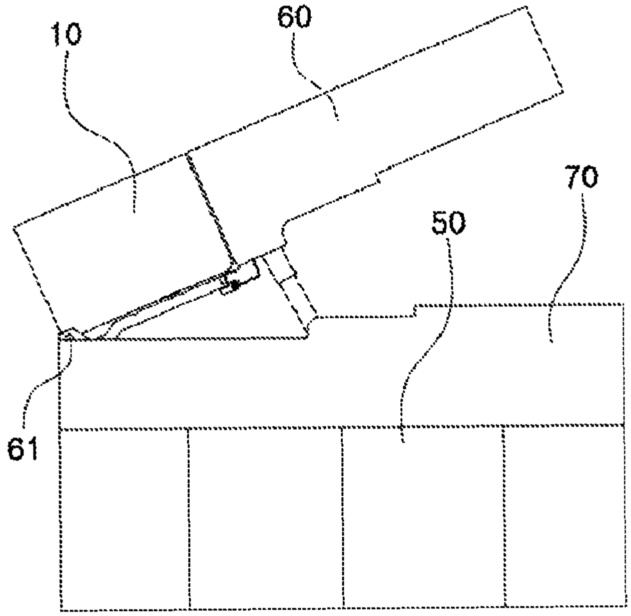

*[Fig. 3]*
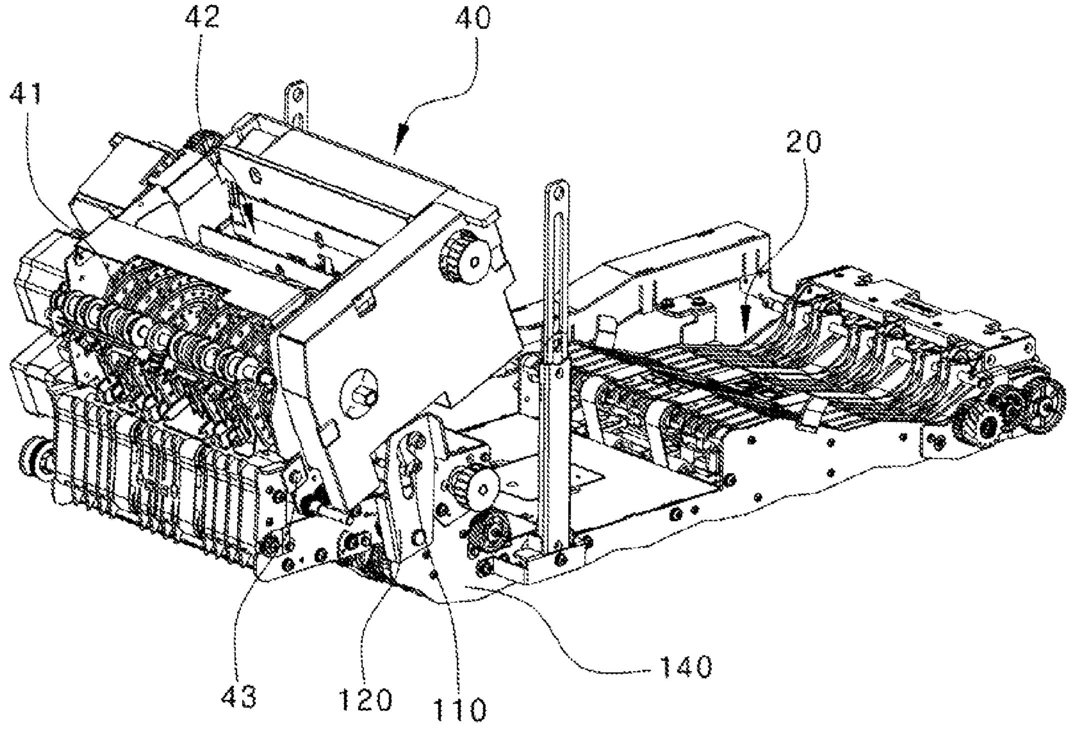

*[Fig. 4]*
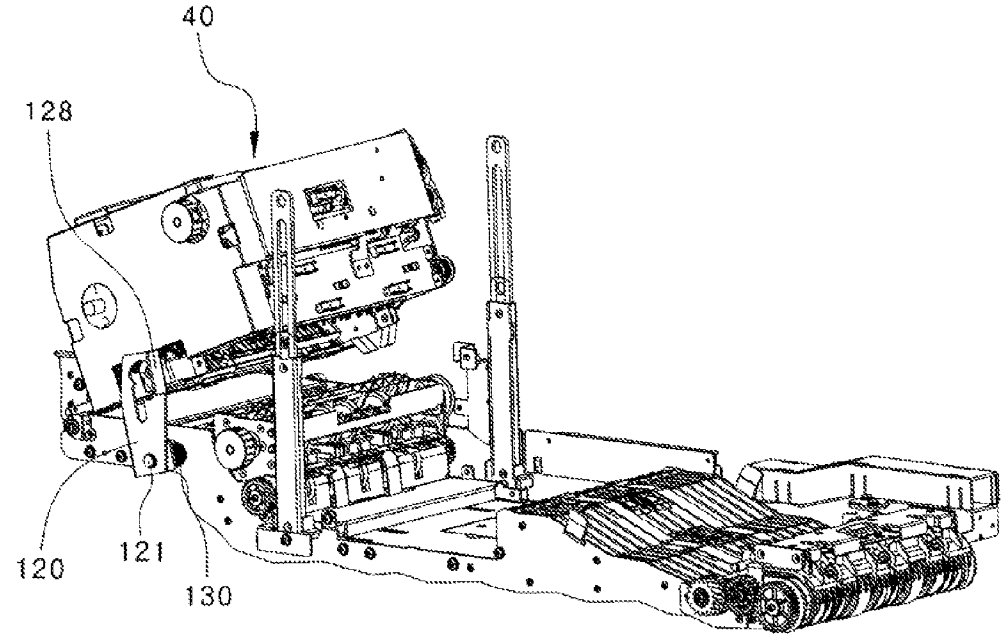
*[Fig. 5]*
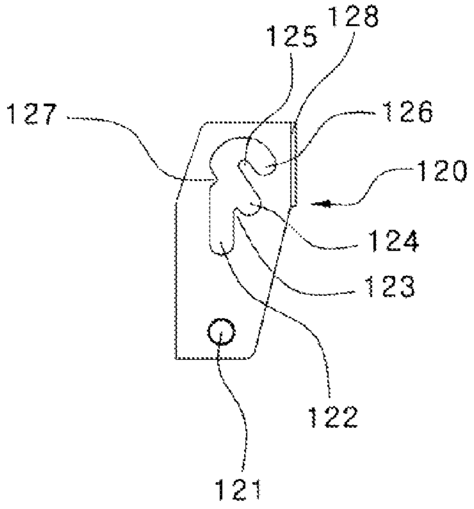

[Fig. 6]
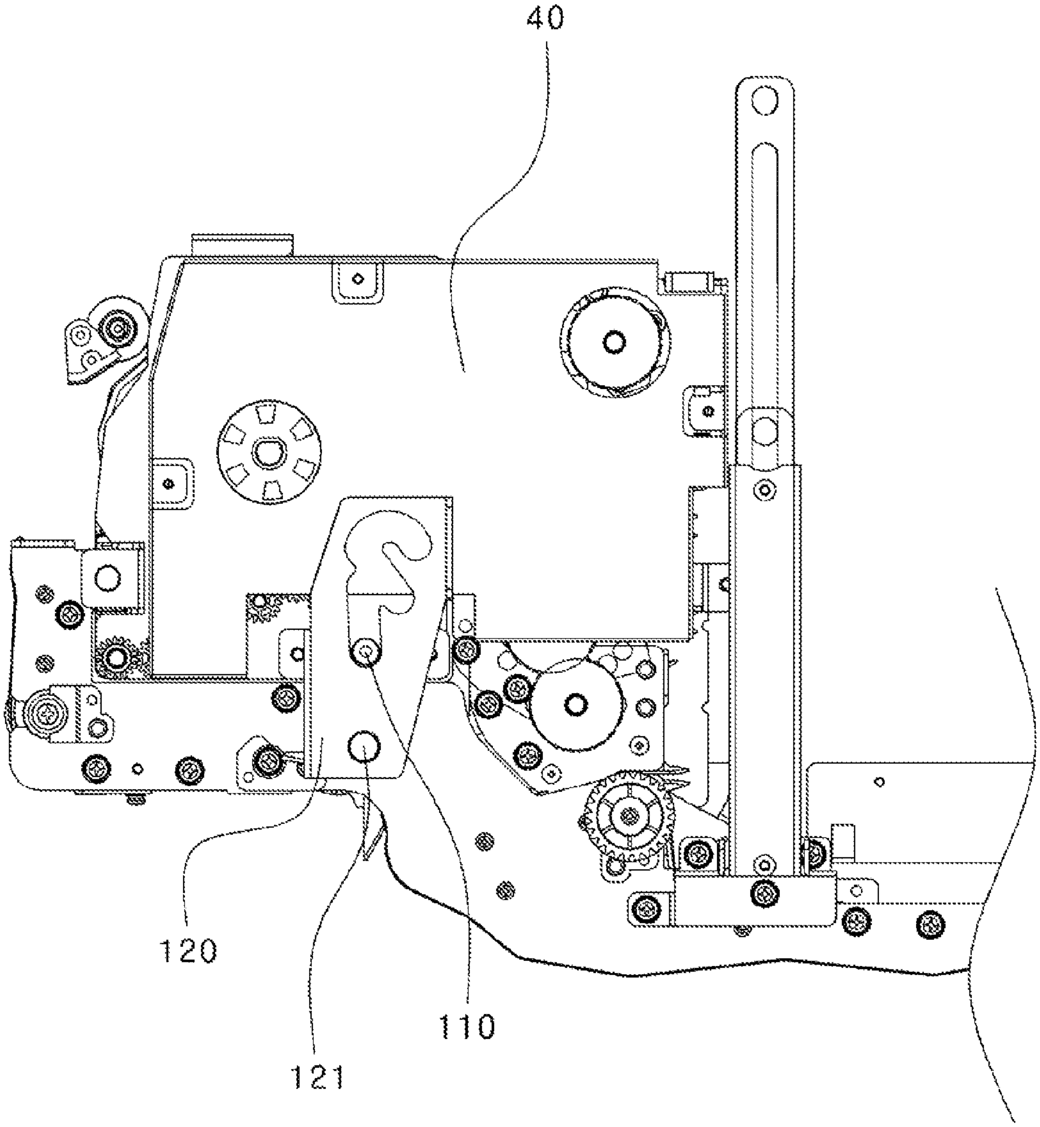

[Fig. 7]
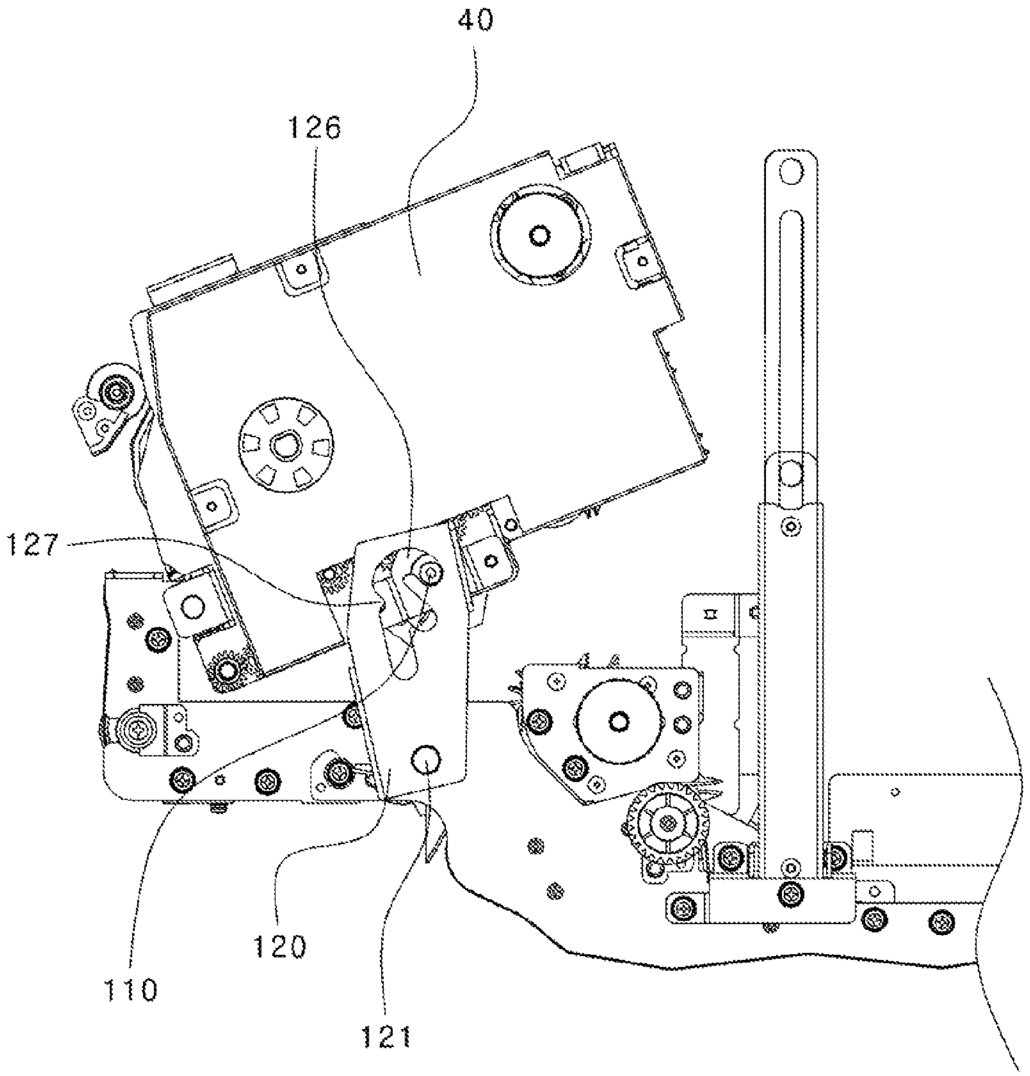

[Fig. 8]
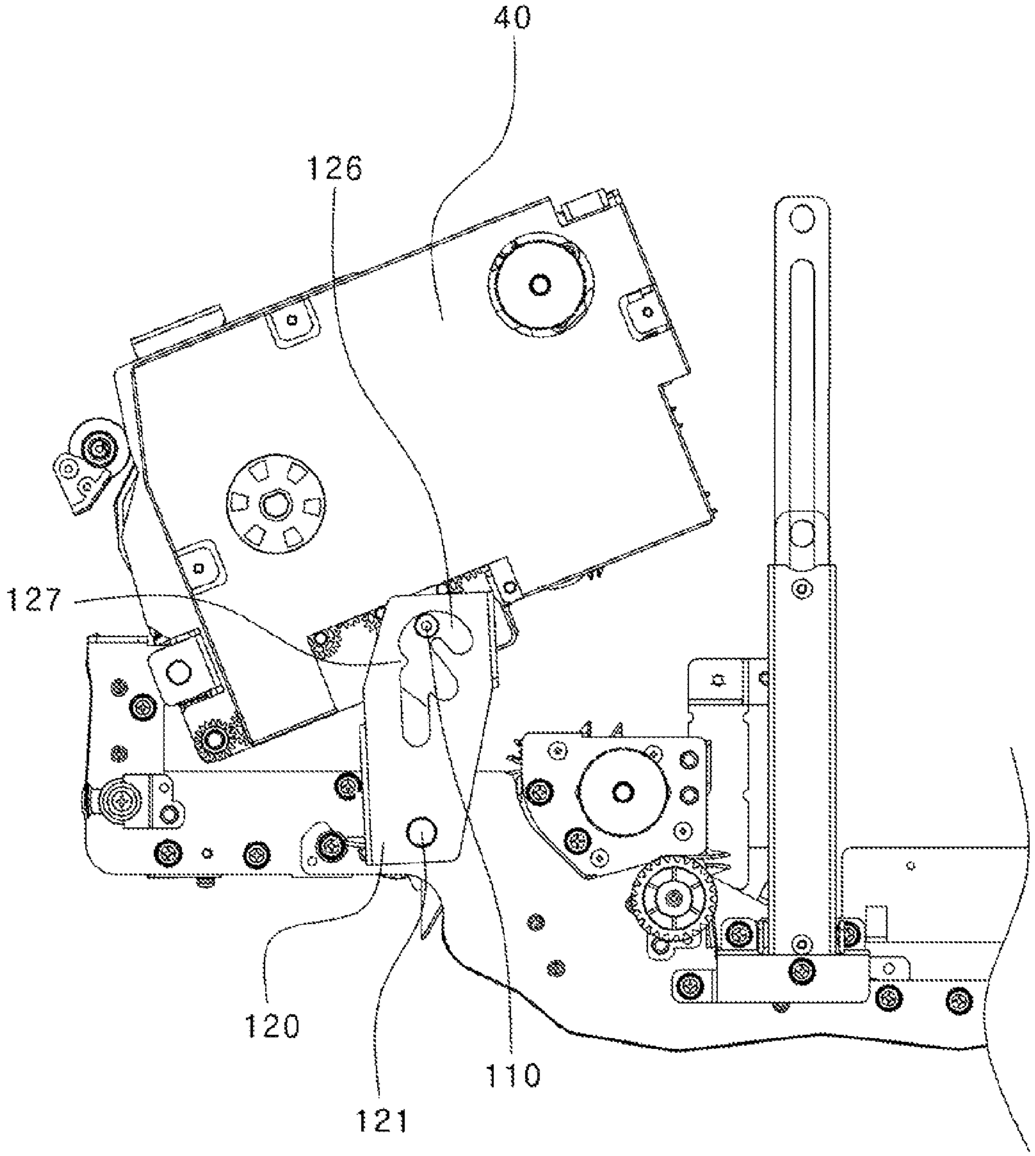

[Fig. 9]
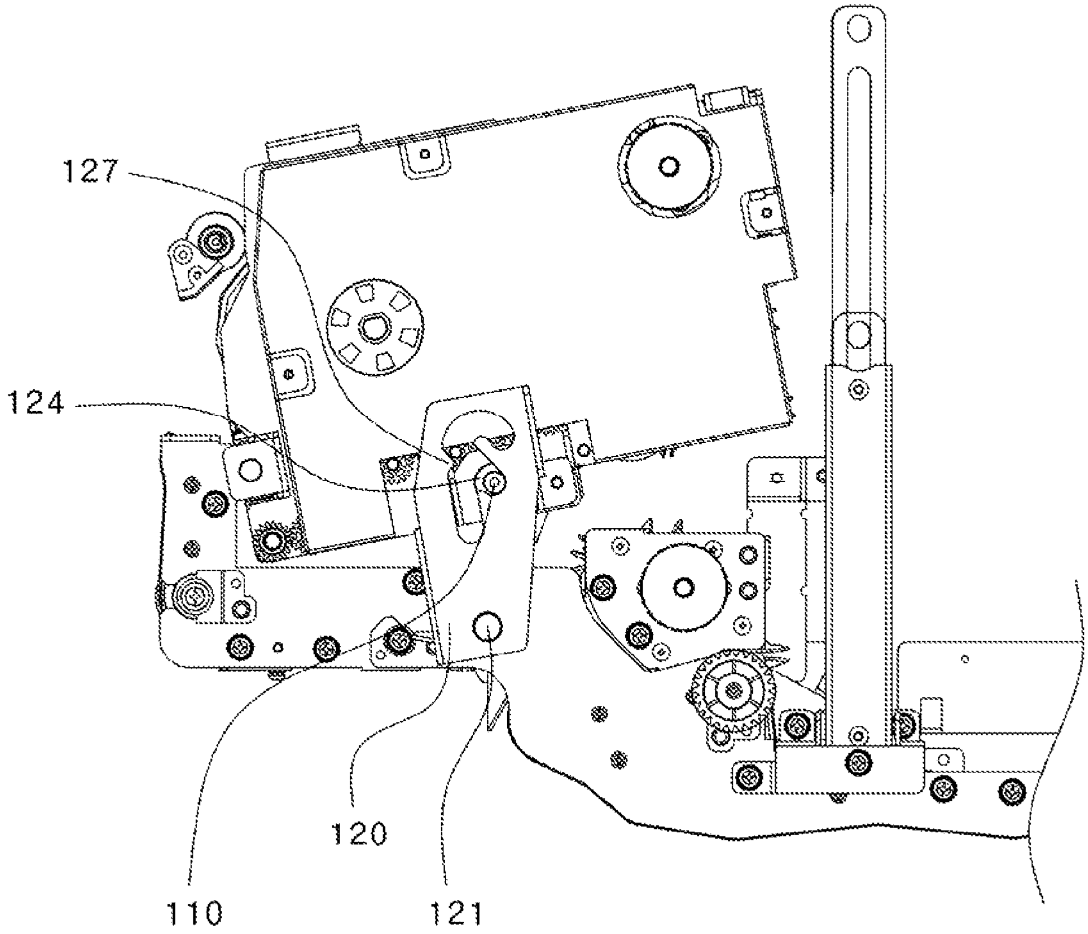

*[Fig. 10]*
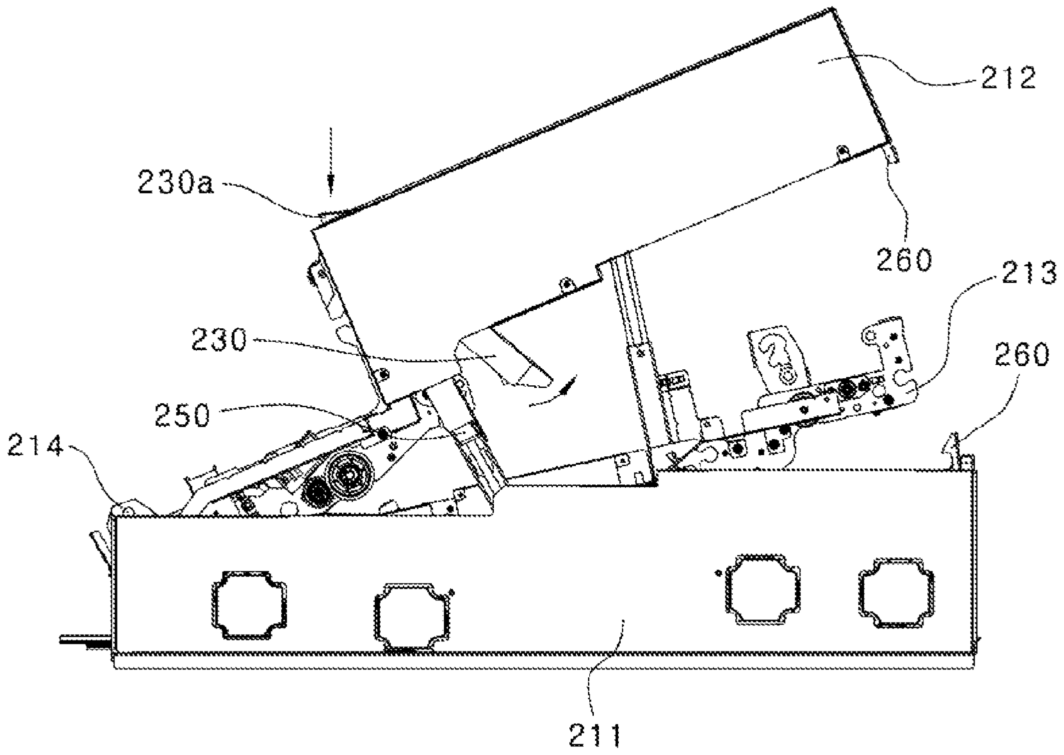

*[Fig. 11]*
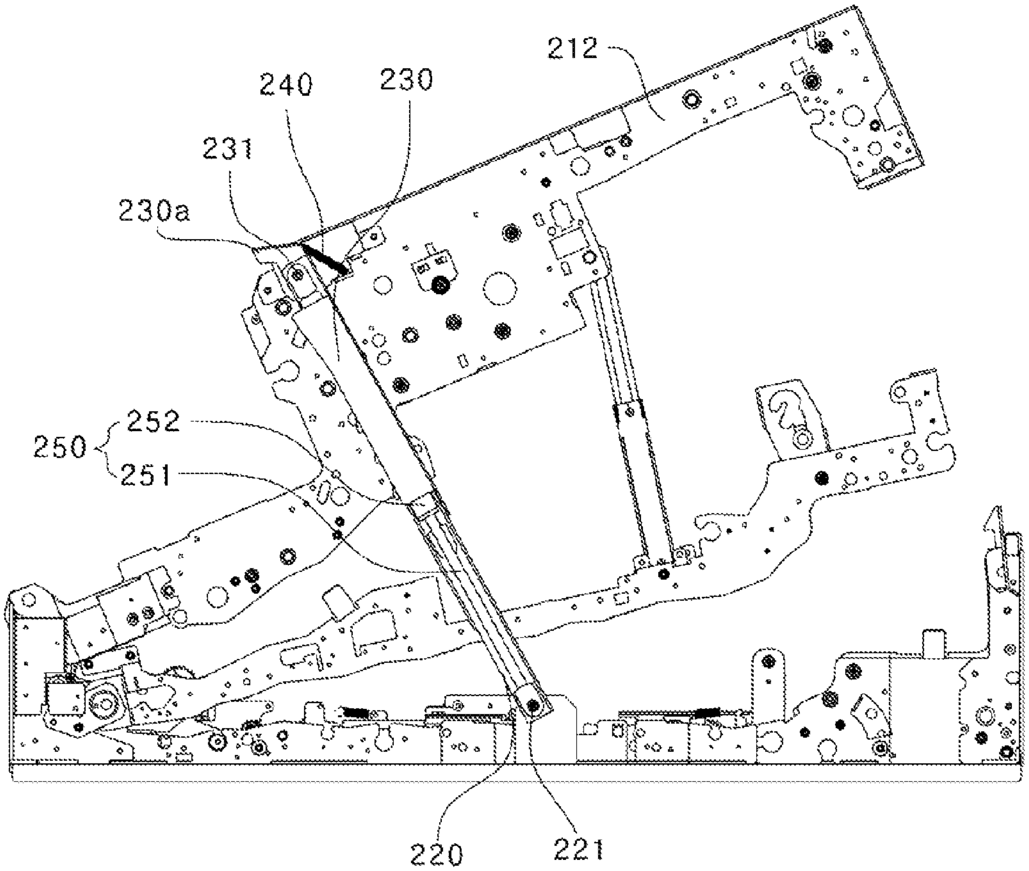

*[Fig. 12]*
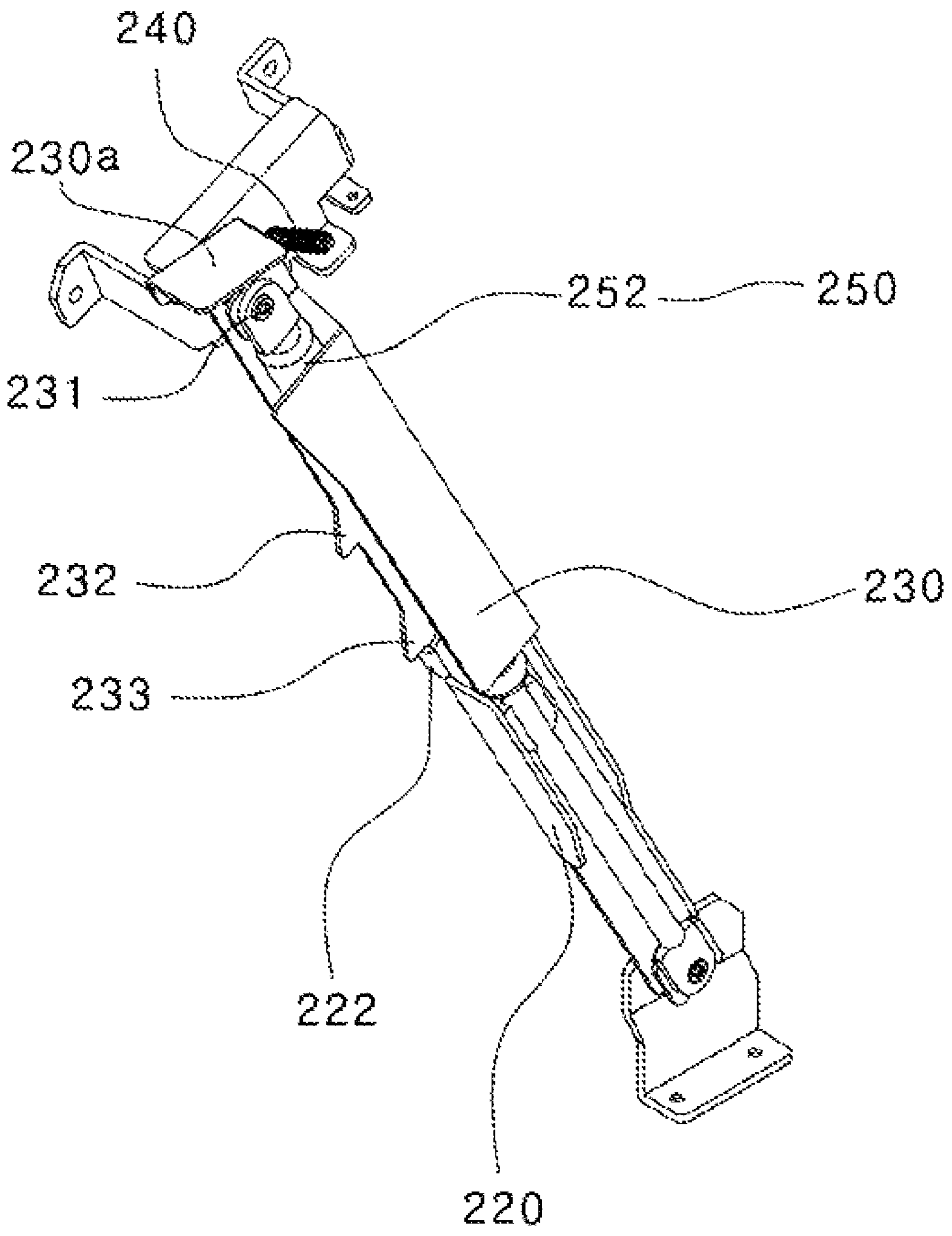

*[Fig. 13]*
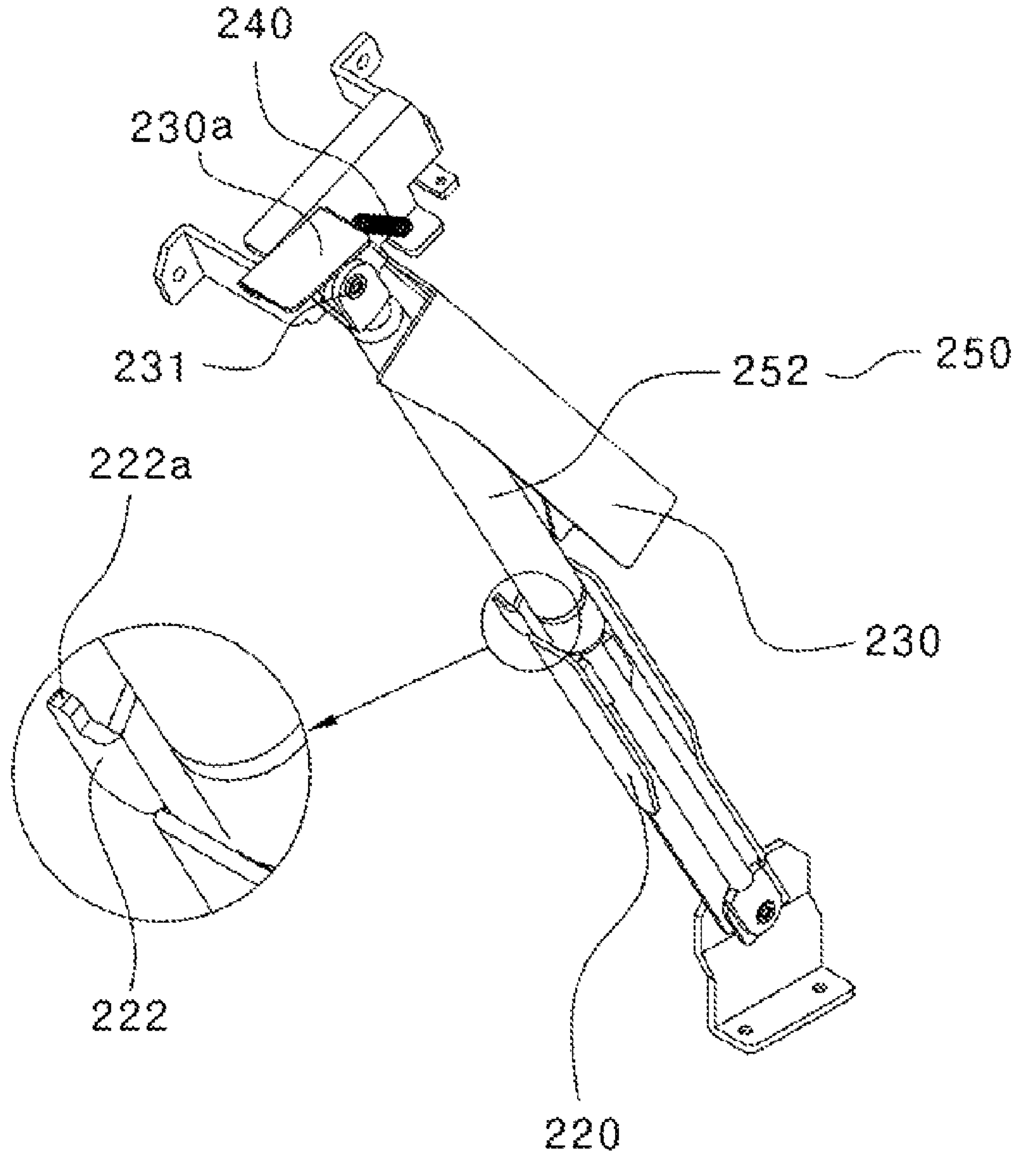

TWO-STAGE LOCK STRUCTURE OF AUTOMATIC TELLER MACHINE

BACKGROUND OF THE INVENTION

1. Field of the Invention

The present invention relates to a two-stage lock structure provided in an automatic teller machine, and more particularly to a two-stage lock structure of an automatic teller machine that can prevent an operator from being injured during the removal of a currency note jam occurring on a conveyance path in an automatic teller machine.

2. Description of the Prior Art

In general, a cash dispenser unit (CDU) and a billing recycling machine (BRM) have been used as automatic teller machines that quickly and conveniently provide most of financial services anytime without consulting with a person. The CDU has been used since the initial computerization of financial services, and is used to withdraw only cash. The BRM has a deposit function in addition to a cash dispensing function.

FIG. 1 is a schematic view showing the structure of a general ATM (automatic teller machine).

An automatic teller machine includes a deposit/withdrawal unit 10 into/from which a client puts or withdraws currency note, a conveyance path 20 on which the currency note to be put into or withdrawn from the deposit/withdrawal unit 10 is transferred, a discriminating unit 30 that is provided on the conveyance path 20 and discriminates whether currency note is abnormal, a temporary stack 40 in which currency note deposited through the discriminating unit 30 is temporarily loaded, and a plurality of recycling boxes 50 in which currency note deposited by a client is loaded and withdrawn to circulate currency note.

Various units, such as a card handling unit and a bankbook handling unit, having various functions may be added to the automatic teller machine in addition to the above-mentioned units for depositing and withdrawing currency note.

Currency note is transferred on the conveyance path 20 in the above-mentioned automatic teller machine. The currency note to be transferred causes a jam on the conveyance path 20 due to various factors, thereby causing machine troubles.

In this case, currency note causing the jam should be removed from the machine. Meanwhile, the automatic teller machine includes a currency note jam removing structure shown in FIG. 2 to facilitate the removal of the currency note jam.

FIG. 2 is a schematic view showing that an upper frame is moved upward and a conveyance path is opened in order to remove a currency note jam of an ATM.

An upper frame 60 and a lower frame 70 are provided on the recycling boxes 50. The deposit/withdrawal unit 10 is formed at one end of the upper frame 60, and a conveyance path is formed between the upper frame 60 and the lower frame 70.

The upper frame 60 is moved upward by rotating about the hinge shaft 61. Accordingly, if the upper frame 60 is moved upward when a currency note jam occurs on the conveyance path, the conveyance path is opened.

When the conveyance path is opened, an operator removes currency note causing the jam on the conveyance path. In this case, since the upper frame 60 and the lower frame 70 are provided with a temporary stack and a currency note discriminating unit, the frames become heavy. For this reason, if the upper frame 60 descends while an operator's hand is positioned between the upper frame 60 and the lower frame 70, the operator may be injured.

Accordingly, there has been a demand for a structure that can prevent the operator from being injured even if the upper frame 60 moved upward descends during the removal of a currency note jam.

SUMMARY OF THE INVENTION

The present invention has been made to solve the above-mentioned problem, and an object of the present invention is to provide a two-stage lock structure of an automatic teller machine that can prevent an operator's hand from being injured due to a heavy unit when a heavy unit such as a temporary stack or an upper frame is lifted to remove currency note causing a jam on a conveyance path.

Another object of the present invention is to provide a two-stage lock structure of an automatic teller machine capable of preventing injury to an operator's hand by using a structure where an operator presses a locking lever with one hand and then presses an upper frame with the other hand to close the opened upper frame during the removal of a currency note jam.

According to an aspect of the present invention, a two-stage lock structure of an automatic teller machine includes a temporary stack to be moved upward by rotating about a temporary stack hinge shaft to open a conveyance path when a currency note jam occurs; a protruding member protruding from one surface of the temporary stack; a stopper that includes a first aperture, a second aperture formed above the first aperture, and a slide aperture, and is moved by rotating about a stopper hinge shaft; and an elastic member provided to pull the stopper in a direction where the protruding member is held in the first or second aperture. The first and second apertures are formed so that the protruding member is inserted into and caught in the first or second aperture to hold the temporary stack rotated about the temporary stack hinge shaft, and the slide aperture is formed so that the protruding member slides in the slide aperture when the closed conveyance path formed below the temporary stack is opened.

In this structure, a handle may be formed at a predetermined upper portion of the stopper.

Further, the protruding member may have a cylindrical shape. The stopper may include: a first catching portion inclined downward from a round end, which is formed between the slide aperture and the first aperture, toward the first aperture; and a second catching portion inclined downward from a round end, which is formed between the first and second apertures, toward the first aperture. Furthermore, a convex guiding portion may be formed in the stopper so as to face the second catching portion.

In addition, the elastic member may be a torsion spring wound around the stopper hinge shaft.

According to another aspect of the present invention, a two-stage lock structure of an automatic teller machine includes: an upper frame that is provided above a lower frame and is moved upward by rotating about a frame hinge shaft, when a currency note jam occurs, in order to open a conveyance path; a supporting member having one end hinge-connected to the lower frame and the other end provided with a catching portion; a locking lever having one end hinge-connected to one surface of the upper frame and the other end provided with first and second protrusions; and an elastic member provided to pull the locking lever in a direction where the first or second protruding member is caught by the catching portion of the supporting member and held. When the upper frame is moved upward by rotating about the frame hinge shaft, the first or second protrusion is caught by the catching portion of the supporting member so as to prevent the upper frame from descending.

In this structure, a gas spring may be provided between the upper frame and the lower frame. Further, when the upper frame is moved by rotating about the frame hinge shaft, the upper frame does not descend due to a supporting force of the gas spring.

In addition, each of the supporting member and the locking lever may have a U-shaped cross-section, a piston rod and a cylinder of the gas spring may be provided to pass through the U-shaped cross-sections of the supporting member and the locking lever, and a direction corresponding to an opening of the U-shaped cross-section of the supporting member may be different from a direction corresponding to an opening of the U-shaped cross-section of the locking lever.

Further, each of the first and second protrusions of the locking lever may have a shape of a right-angle triangle.

Furthermore, the elastic member may be a spring that has one end connected to the locking lever above the locking lever hinge shaft and the other end connected to the upper frame at a predetermined position.

In addition, when the first or second protrusion is caught by the catching portion of the supporting member, an upper end of the locking lever may protrude from the upper surface of the upper frame. Further, when the upper end of the locking lever is pressed, the first or second protrusion may be released from the catching portion against the elastic force of the elastic member.

Furthermore, a separation preventing protrusion may protrude from the catching portion in order to prevent the first and second protrusions of the locking lever from being separated from the catching portion.

BRIEF DESCRIPTION OF THE DRAWINGS

FIG. 1 is a schematic view showing the structure of a general ATM (automatic teller machine);

FIG. 2 is a schematic view showing that an upper frame is moved upward and a conveyance path is opened in order to remove a currency note jam of an ATM;

FIGS. 3 and 4 are perspective views showing that a temporary stack is moved upward in a two-stage lock structure according to an embodiment of the present invention;

FIG. 5 is a detailed view of a stopper shown in FIGS. 3 and 4;

FIG. 6 is a view showing that the conveyance path formed below the temporary stack is closed in the two-stage lock structure according to the embodiment of the present invention;

FIG. 7 is a view showing that a protruding member shown in FIG. 6 is caught in a second aperture;

FIG. 8 is a view showing that the protruding member shown in FIG. 6 is separated from the second aperture;

FIG. 9 is a view showing that the protruding member shown in FIG. 6 is caught in a first aperture;

FIG. 10 is a side view of a two-stage lock structure according to another embodiment of the present invention;

FIG. 11 is a side view showing the inner structure of upper and lower frames shown in FIG. 10;

FIG. 12 is a perspective view showing a locking lever and a supporting member, which are shown in FIG. 10; and FIG. 13 is a perspective view showing that the locking member shown in FIG. 10 is swung.

DESCRIPTION OF THE PREFERRED EMBODIMENTS

The structure and operation of preferred embodiment according to an embodiment of the present invention will be described in detail below with reference to accompanying drawings. When elements shown in the drawings are indicated by reference numerals, it is understood that like elements are indicated by like reference numerals, if possible, even in different drawings.

FIGS. 3 and 4 are perspective views showing that a temporary stack is moved upward in a two-stage lock structure according to an embodiment of the present invention, and FIG. 5 is a detailed view of a stopper shown in FIGS. 3 and 4. The construction of the two-stage lock structure according to the embodiment of the present invention will be described below with reference to FIGS. 3 to 5.

When a client puts currency note into a deposit/withdrawal unit 10 to deposit money in the bank, the input currency note is temporarily stacked in a temporary stack 40. Then, when the client selects a menu for confirming deposit, the currency note is loaded in a recycling box 50 through a conveyance path 20.

The temporary stack 40 is provided with stacking wheels 41 in order to load the currency note, which is transferred from the deposit/withdrawal unit 10, to a currency note loading space 42 one-by-one. The currency note, which is temporarily stacked in the currency note loading space 42, is separated one-by-one by a separating unit (not shown), which includes pick-up rollers provided below the temporary stack 40, and then transferred to the recycling box 50.

In this case, if a currency note jam occurs on the conveyance path provided below the temporary stack 40, currency note causing the jam should be removed. For this purpose, the temporary stack 40 is moved by rotating about a temporary stack hinge shaft 43 in a counterclockwise direction so as to open the conveyance path on which a currency note jam occurs, and an operator then removes the currency note causing the jam by hand.

Meanwhile, since the temporary stack 40 is heavy, the temporary stack 40 may be rotated in a clockwise direction and descend while an operator's hand is positioned below the temporary stack 40. For this reason, the operator's hand may be injured.

To prevent the operator from being injured, the structure according to the prevent invention includes a protruding member 110, a stopper 120 having first and second apertures 124 and 126, and an elastic member 130.

The protruding member 110 protrudes from one surface of the temporary stack 40. When the temporary stack 40 has been rotated in the counterclockwise direction, the protruding member 110 is inserted into and caught in a first or second aperture 124 or 126 of a stopper 120, to be described below, in order to prevent the temporary stack 40 from descending.

The protruding member 110 has any shape as long as the protruding member is inserted into and caught in the first and second apertures 124 and 126. However, it is preferable that the protruding member have a cylindrical shape.

The stopper 120 includes the first aperture 124 and the second aperture 126 formed above the first aperture 124. The first and second apertures are formed so that the protruding member 110 is inserted into and caught in the first or second aperture to hold the temporary stack 40 that is moved by rotating about the temporary stack hinge shaft 43.

Further, a linear slide aperture 122 is formed below the first aperture 124 in a vertical direction. When the temporary stack 40 closing the conveyance path formed therebelow is rotated in the counterclockwise direction in order to open the conveyance path, the protruding member 110 slides in the slide aperture 122.

Meanwhile, the stopper 120 is rotated about the stopper hinge shaft 121.

A first catching portion 123 is formed between the slide aperture 122 and the first aperture 124 of the stopper 120. Since one corner of the first catching portion 123 is formed to have a round shape, the cylindrical protruding member 110 is easily inserted into the first aperture 124 from the slide aperture 122. In contrast, since the other corner of the first catching portion is formed to be inclined downward toward the first aperture 124, the protruding member 110 caught in the first aperture 124 is not easily separated from the first aperture.

In addition, a second catching portion 125 is formed between the first aperture 124 and the second aperture 126 of the stopper 120. Since one corner of the second catching portion 125 is formed to have a round shape, the cylindrical protruding member 110 is easily inserted into the second aperture 126 from the first aperture 124. In contrast, since the other corner of the second catching portion is formed to be inclined downward toward the second aperture 126, the protruding member 110 caught in the second aperture 126 is not easily separated from the second aperture.

It is preferable that a convex guiding portion 127 is formed in the stopper 120 so as to face the second catching portion 125. When the protruding member 110 is separated from the second aperture 126, the protruding member 110 is naturally caught in the first aperture 124 due to a restoring force of an elastic member 130 to be described below. In this case, the protruding member 110 is guided by the guiding portion 127 so as to be caught in the first aperture 124.

It is preferable that a handle 128 be formed at a predetermined upper portion of the stopper 120 to prevent injury to the operator's hand. That is, when the temporary stack 40 is moved upward, an operator should support the temporary stack 40 with one hand and grip the handle 128 of the stopper 120 with the other hand in order to close the conveyance path formed below the temporary stack 40. Therefore, it is possible to prevent an operator's hand from being positioned below the temporary stack 40.

The elastic member 130 is provided to pull the stopper 120 in a direction where the protruding member 110 is held in the first or second aperture 124 or 126, that is, in the counterclockwise direction. In this case, in order to simplify the structure, it is preferable that the elastic member 130 be composed of a torsion spring wound on the outer peripheral surface of the stopper hinge shaft 121 between the frame 140 and the stopper 120.

However, the elastic member is not limited thereto, and it is apparent to those skilled in the art that one end of the elastic member 130 is connected to the stopper 120 and the other end of the elastic member is connected to the frame 140 at a predetermined position.

FIG. 6 is a view showing that the conveyance path formed below the temporary stack is closed in the two-stage lock structure according to the embodiment of the present invention. FIG. 7 is a view showing that the protruding member shown in FIG. 6 is caught in the second aperture. FIG. 8 is a view showing that the protruding member shown in FIG. 6 is separated from the second aperture. FIG. 9 is a view showing that the protruding member shown in FIG. 6 is caught in the first aperture. The operation of the two-stage lock structure according to the embodiment of the present invention will be described below with reference to FIGS. 6 to 9.

Referring to FIG. 6, the protruding member 110 of the temporary stack 40 is inserted into the slide aperture 122 of the stopper 120, and the conveyance path formed below the temporary stack 40 is closed. Further, the currency note is transferred along the conveyance path.

In this case, when a currency note jam occurs on the conveyance path, an operator moves upward the temporary stack 40 as shown in FIG. 7 in order to remove currency note causing the jam and opens the conveyance path formed below the temporary stack 40. In this case, the protruding member 110 is held in the second aperture 126 of the stopper 120.

After removing the currency note causing the jam, the operator rotates the temporary stack 40 in the clockwise direction to close the conveyance path formed below the temporary stack 40. In this case, as shown in FIG. 8, the protruding member 110 separated from the second aperture 126 is naturally moved toward the first aperture 124 due to a restoring force of the elastic member 130, and is guided by the guiding portion 127. As a result, the protruding member 110 is caught in the first aperture 124 as shown in FIG. 9.

Accordingly, even if the operator's hand is positioned below the temporary stack 40, the temporary stack 40 is not completely closed, so that it is possible to prevent the operator's hand from being caught by the temporary stack.

The structure for opening or closing the conveyance path formed below the temporary stack 40 has been described above, but the present invention is not limited thereto. That is, it is apparent to those skilled in the art that the two-stage lock structure according to an embodiment of the present invention can be applied to parts, which need to be opened or closed due to the occurrence of a currency note jam.

FIG. 10 is a side view of a two-stage lock structure according to another embodiment of the present invention. FIG. 11 is a side view showing the inner structure of upper and lower frames shown in FIG. 10. FIG. 12 is a perspective view showing a locking lever and a supporting member, which are shown in FIG. 10. FIG. 13 is a view showing that the locking member shown in FIG. 10 is swung. The construction and operation of the two-stage lock structure according to another embodiment of the present invention will be described below with reference to FIGS. 10 to 13.

The two-stage lock structure according to this embodiment includes a lower frame 211 and an upper frame 212 provided above the lower frame 211. Further, a middle frame 213 may be provided between the upper and lower frames. A conveyance path on which currency note is transferred is formed between the upper and lower frames 212 and 211 and the middle frame 213.

When a currency note jam occurs on the conveyance path, an operator releases a frame lock 260 and then rotates the upper frame 212 and/or the middle frame 213 about a frame hinge shaft 214 so as to open the conveyance path.

When the upper frame 212 and the middle frame 213 have been rotated, the descent of the upper and middle frames 212 and 213 should be prevented so as to remove currency note causing the jam. For this purpose, a supporting member 220 and a locking lever 230 are provided between the lower frame 211 and the upper frame 212. The supporting member 220 includes a catching portion 222. The locking lever 230 includes a first protrusion 232, which is caught by the catching portion 222 to prevent the descent, and a second protrusion 233 formed below the first protrusion 232.

One end of the supporting member 220 is hinge-connected to the lower frame 211 by using a supporting member hinge shaft 221, and the other end of the supporting member has the catching portion 222. It is preferable that the catching portion 222 be bent to have a U shape (not shown) in order to prevent the locking lever 230 from being separated to the left or right side during the ascent and descent of the locking lever.

One end of the locking lever 230 is hinge-connected to the upper frame 212 by using a locking lever hinge shaft 231. If an operator releases the frame lock 260 and then rotates the upper frame 212 about the frame hinge shaft 214, the first protrusion 232 is caught by the upper end of the catching portion 222. After that, if the operator further lifts the upper frame 212, the second protrusion 233 is caught by the upper portion of the catching portion 222. Therefore, the descent of the upper frame 212 is prevented.

The upper end of the locking lever 230 is connected to an elastic member 240. The elastic member 240 is provided to pull the locking lever in a direction where the first or second protrusions 232 or 233 is caught by the upper end of the catching portion 222 of the supporting member 220 and held. That is, a spring may be used as an example of the elastic member 240. One end of the elastic member is connected to the locking lever 230 provided above the locking lever hinge shaft 231, and the other end of the elastic member is connected to the upper frame 212 at a predetermined position.

Accordingly, since the elastic member 240 applies an elastic force for rotating the locking lever 230 about the locking lever hinge shaft 231, the first or second protrusion 232 or 233 is caught by the upper end of the catching portion 222 and held.

Further, while an operator's hand is positioned between the upper frame 212 and the lower frame 211, the first protrusion 232 is caught by the catching portion 222 due to the elastic force of the elastic member 240 even though the second protrusion 233 is released from the catching portion 222 and the upper frame 212 thus descends. Therefore, it is possible to prevent the operator from being injured.

In this case, it is preferable that a separation preventing protrusion 222*a* protrude from the catching portion 222 in order to prevent the first and second protrusions 232 and 233 of the locking lever 230 from being separated from the catching portion.

Meanwhile, since various parts for transferring and processing currency note are provided in the upper frame 212, the upper frame is heavy. For this reason, it is preferable that a gas spring 250 be provided between the upper frame 212 and the lower frame 211. Accordingly, when an operator moves upward the upper frame 212 about the frame hinge shaft 214, the upper frame 212 does not descend due to a supporting force of the gas spring 250.

The gas spring 250 includes a piston rod 251 and a cylinder 252, and the upper end of the cylinder 252 is hinge-connected to the locking lever hinge shaft 231.

Further, each of the supporting member 220 and the locking lever 230 has a U-shaped cross-section, and the piston rod 251 and the cylinder 252 of the gas spring 250 are provided to pass through the U-shaped cross-sections of the supporting member 220 and the locking lever 230.

In this case, it is preferable that a direction corresponding to the opening of the U-shaped cross-section of the supporting member 220 is different from a direction corresponding to the opening of the U-shaped cross-section of the locking lever 230 in order to prevent the gas spring 250 from being separated from the supporting member and the locking lever. In this embodiment, the direction corresponding to the opening of the U-shaped cross-section of the supporting member is orthogonal to the direction corresponding to the opening of the U-shaped cross-section of the locking lever.

In addition, each of the first and second protrusions 232 and 233 may preferably have the shape of a right-angle triangle so that the first and second protrusions 232 and 233 of the locking lever 230 are easily caught by the catching portion 222 of the supporting member 220 when the upper frame 212 is moved upward and the first and second protrusions 232 and 233 are not easily separated from the upper end of the catching portion 222.

Meanwhile, when the first protrusion 232 or the second protrusion 233 is caught by the catching portion 222 of the supporting member 220, it is preferable that the upper end 230*a* of the locking lever 230 protrude from the upper frame 212.

When an operator presses the upper end 230*a* of the locking lever 230, the locking lever 230 is swung about the locking lever hinge shaft 231 against the elastic force of the elastic member 240. Accordingly, the first protrusion 232 or the second protrusion 233 is released from the catching portion.

According to the above-mentioned structure, when moving downward the upper frame 212 in order to close the conveyance path, an operator should press the upper surface of the upper frame 212 with one hand and press the upper end 230*a* of the locking lever 230 with the other hand. For this reason, the operator should use one's both hands. Therefore, it is possible to prevent an operator's hand from being injured between the upper frame 212 and the lower frame 211.

As described in detail above, according to the embodiment of the present invention, an automatic teller machine includes a two-stage lock structure for allowing a heavy unit, such as a temporary stack or an upper frame, not to descend to a position where the operator's hand may be positioned. Therefore, when an operator removes a currency note jam, it is possible to prevent the operator from being injured.

What is claimed is:

1. A two-stage lock structure, the two-stage lock structure comprising:

a temporary stack to be moved upward about a temporary stack hinge shaft to open a conveyance path when a currency note jam occurs in an automatic teller machine;

a protruding member protruding from one surface of the temporary stack;

a stopper that includes a first aperture, a second aperture formed above the first aperture, and a slide aperture and is moved by rotating about a stopper hinge shaft, the first and second apertures being formed so that the protruding member is inserted into and caught in the first or second aperture to hold the temporary stack rotated about the temporary stack hinge shaft, and the slide aperture being formed so that the protruding member slides in the slide aperture when the conveyance path formed below the temporary stack is opened; and an elastic member provided to pull the stopper in a direction where the protruding member is held in the first or second aperture.

2. The two-stage lock structure according to claim 1, wherein a handle is formed at a predetermined upper portion of the stopper.

3. The two-stage lock structure according to claim 1, wherein the protruding member has a cylindrical shape, and the stopper includes:

a first catching portion inclined downward from a round end, which is formed between the slide aperture and the first aperture, toward the first aperture; and a second catching portion inclined downward from a round end, which is formed between the first and second apertures, toward the first aperture.

4. The two-stage lock structure according to claim 3, wherein a convex guiding portion is formed in the stopper so as to face the second catching portion.

5. The two-stage lock structure according to claim 1, wherein the elastic member is a torsion spring wound around the stopper hinge shaft.

* * * * *